United States Patent [19]

Mauch et al.

[11] Patent Number: 5,072,584

[45] Date of Patent: Dec. 17, 1991

[54] HYDRAULIC DRIVE WITH FLUID COOLING BY-PASS LINE

[76] Inventors: Magnus Mauch, J.-Kerner-Str. 2, D-7320 Göppingen; Achim L. Kehrberger, E.-Kirchner-Str. 33, D-7302 Ostfildern, both of Fed. Rep. of Germany

[21] Appl. No.: 399,488

[22] PCT Filed: Mar. 22, 1988

[86] PCT No.: PCT/EP88/00231

§ 371 Date: Sep. 7, 1989

§ 102(e) Date: Sep. 7, 1989

[87] PCT Pub. No.: WO88/07633

PCT Pub. Date: Oct. 6, 1988

[30] Foreign Application Priority Data

Mar. 27, 1987 [DE] Fed. Rep. of Germany ....... 3710028

[51] Int. Cl.[5] ........................ F16D 31/02; F15B 11/08

[52] U.S. Cl. ........................................ 60/378; 60/376; 60/456; 60/464; 60/468; 60/494; 91/437

[58] Field of Search ................. 60/912, 329, 369, 377, 60/378, 394, 456, 464, 468, 494; 91/437, 275

[56] References Cited

U.S. PATENT DOCUMENTS

| | | | |
|---|---|---|---|
| 2,688,313 | 9/1954 | Bauer . | |
| 3,593,519 | 7/1971 | Fuhrimann | 60/378 X |
| 3,699,847 | 10/1972 | Little | 60/912 X |
| 4,059,042 | 11/1977 | Bridwell et al. | 91/469 |
| 4,779,418 | 10/1988 | Artzberger | 91/437 X |

FOREIGN PATENT DOCUMENTS 8201226 4/1982 PCT Int'l Appl. .

*Primary Examiner*—Edward K. Look
*Assistant Examiner*—John Ryznic
*Attorney, Agent, or Firm*—Fred Philpitt

[57] ABSTRACT

In a hydraulic drive, in which a double-acting working cylinder (10) is connected to the hydraulic power source by very long working lines (20, 22), it is proposed to connect a bypass line (36) containing a normally closed bypass valve (38) to the ends of the working lines (20, 22) nearest the cylinder. The bypass valve (38) is periodically opened to allow the fluid contained in the working lines (20, 22) to be completely replaced.

8 Claims, 3 Drawing Sheets

HYDRAULIC DRIVE WITH FLUID COOLING BY-PASS LINE

DESCRIPTION

Figure 1:
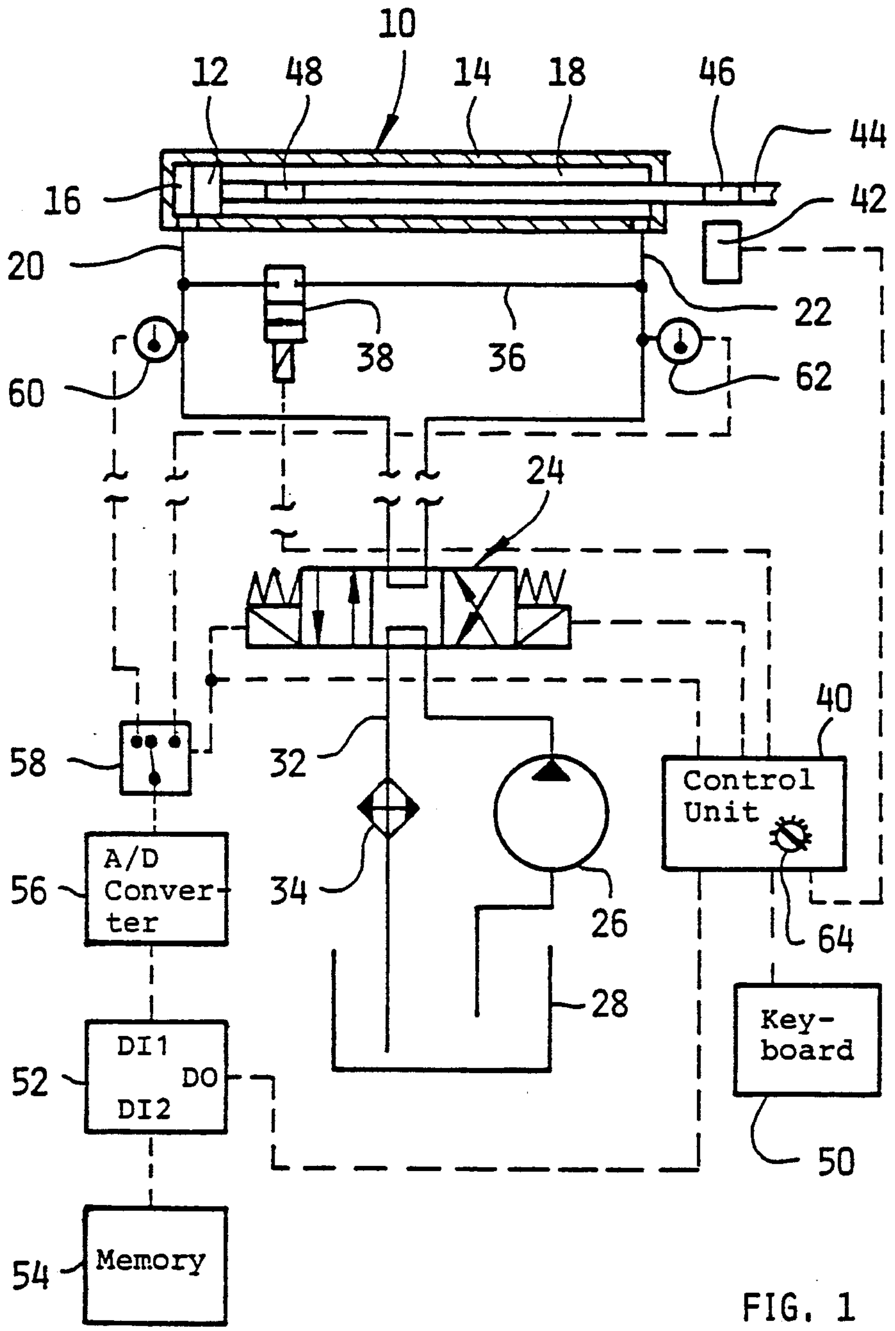

The invention relates to a pressure medium-operated driving device.

Driving devices of this type are used for example in hydraulic rams, which serve for driving concrete piles, sheet-pile walls and the like into the ground. The hydraulic working cylinders serving for lifting a hammer are in practice located at a great distance from the hydraulic power source; the length of the connecting lines between the hydraulic power source and working cylinders may amount to 20 to 70 or 100 meters. With such long connecting lines, the volume of the line is greater than that of the working chambers of the cylinder. This means that with an alternate supply of pressure to the two working chambers of the cylinder, the hydraulic working fluid is displaced in an oscillating manner in connecting lines, but never reaches the sump. Thus, the same partial volumes of the working fluid are always heated in the working cylinder, which in the case of long term operation has a disadvantageous influence on the degree of efficiency of the working cylinder and the useful life of the working fluid.

In WO-A1-82/01226, a pressure medium-operated driving device is described, in which working fluid can be removed by way of a non-return valve arrangement from the working lines extending betwen a working cylinder and a reversing valve and can be returned by way of a cooler to the sump. In this way, undesirably intensive heating of the working fluid is prevented. However, in this known solution, altogether one has four lines, which must be guided into the vicinity of the working cylinder. With long lengths of line, this means a considerable expenditure. Also, the controllable valve arrangement of this known driving device as a whole is complicated.

U.S. Pat. No. 4,059,042 discloses a hydraulic brake system for use under arctic conditions, in which an additional line is guided to the brake cylinder, which in the inoperative position of the specially constructed brake valve flushes the brake line with brake fluid. However, in this case there is no double acting working cylinder and likewise an additional line is not required.

U.S. Pat. No. 2,929,212 discloses a double-acting working cylinder, in which the piston is seated on the center of a continuous piston rod. This piston rod has a scavenging channel, which is permanently connected by way of non-return valves to the working chambers of the cylinder. Connected to the working lines by way of non-return valves is a circulating pump, which sucks the hydraulic oil discharged by way of the hollow piston rod, through an auxiliary line and delivers it by way of a cooler to a line, which is connected by the said non-return valves to the working lines. This type of solution again requires a relatively large number of additional lines; also, it is not possible to use a standard working cylinder, since the piston and piston rod must be modified in a specific way.

A pressure medium-operated driving device according should be developed by the present invention so that even with overall long connecting lines between the working cylinder and the pressure pump or the sump for the working fluid, the volume thereof is comparable with the volume of a working chamber of a cylinder, or greater than the latter, cooling of the working fluid being obtained with an overall simple construction of the pipe system and valve arrangement.

This object is achieved according to the invention by a driving device as described hereinafter.

In a driving device according to one embodiment, one has a controllable bypass line connecting the ends of the working lines nearest the cylinder and by opening this working line, one can force the entire volume of working fluid present in the working lines, through the cooling device and replace it by new working fluid sucked in from the pressure medium sump. Since such an exchange of heated working fluid for cooled working fluid needs to be carried out solely at greater time intervals and since the forcing-through of the working fluid takes place without appreciable resistance and thus quickly, due to the type of scavenging of the working lines proposed according to the invention, no appreciable reduction of the working capacity of the apparatus equipped with a driving device according to the invention is obtained. The proposal according to the invention also requires only low additional structural expenditure. Subsequent fitting on driving devices which are already in use is possible in a simple manner.

In principle, the control of the bypass line may take place manually at intervals of time. The developments of the invention according to one embodiment ensure that the operator needs to pay no attention to the cooling of the working fluid.

In the latter also, it is ensured that the cooling device, which contains mechanically sensitive parts such as cooling fins or cooling coils, can be located at the point of the hydraulic power source, thus far removed from the working cylinder, where it is not exposed to the considerable shocks and vibrations produced at the working place of the cylinder.

Due to the fact that in the driving device according to one embodiment, the reversing valve is located close to the working cylinder, it is ensured that the working fluid is kept in continuous circulation, thus flows continuously through the cooling device.

If the reversing valve according to another embodiment is located on an independent frame part, decoupled as regards vibration, in the vicinity of the working cylinder, then the reversing valve itself may be a relatively complicated control block, which contains pressure-limiting valves, pre-control valves and other sensitive auxiliary valves.

Figure 2:
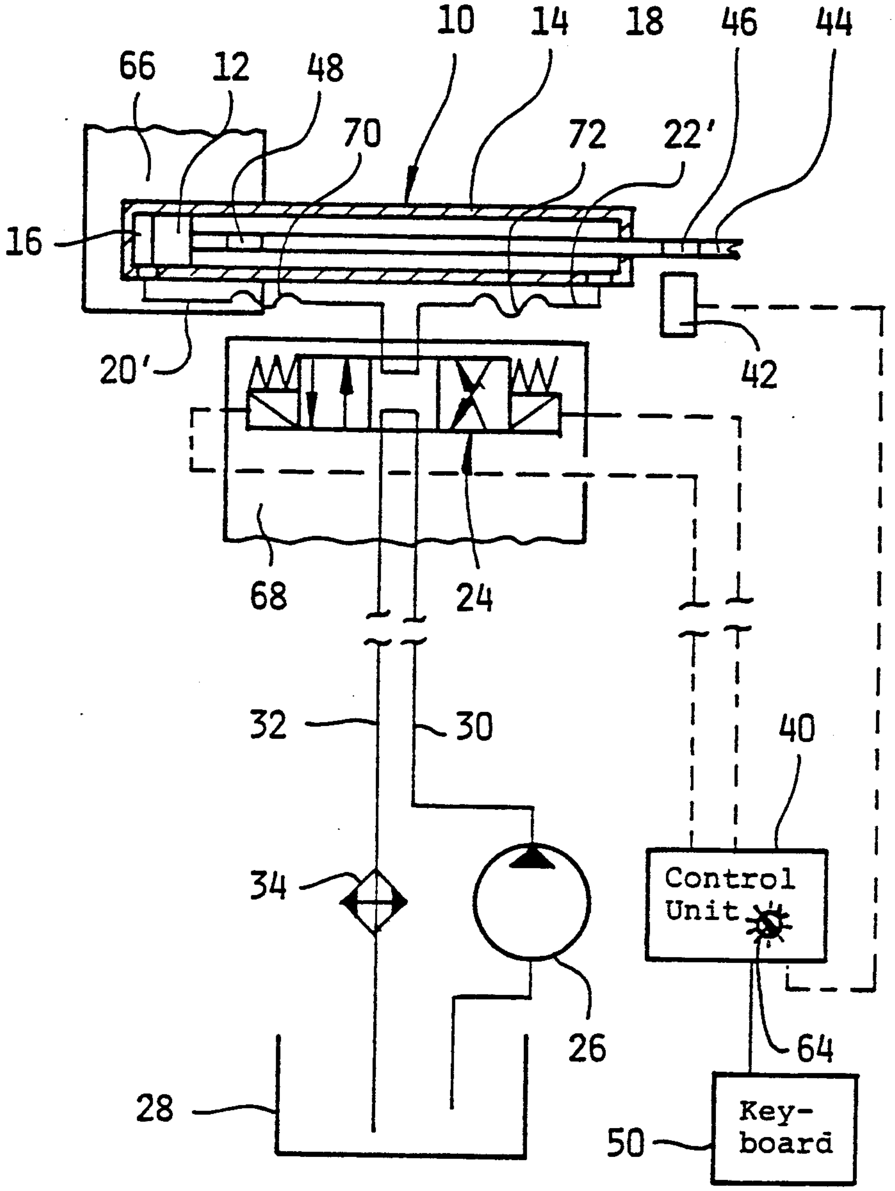
Figure 3:
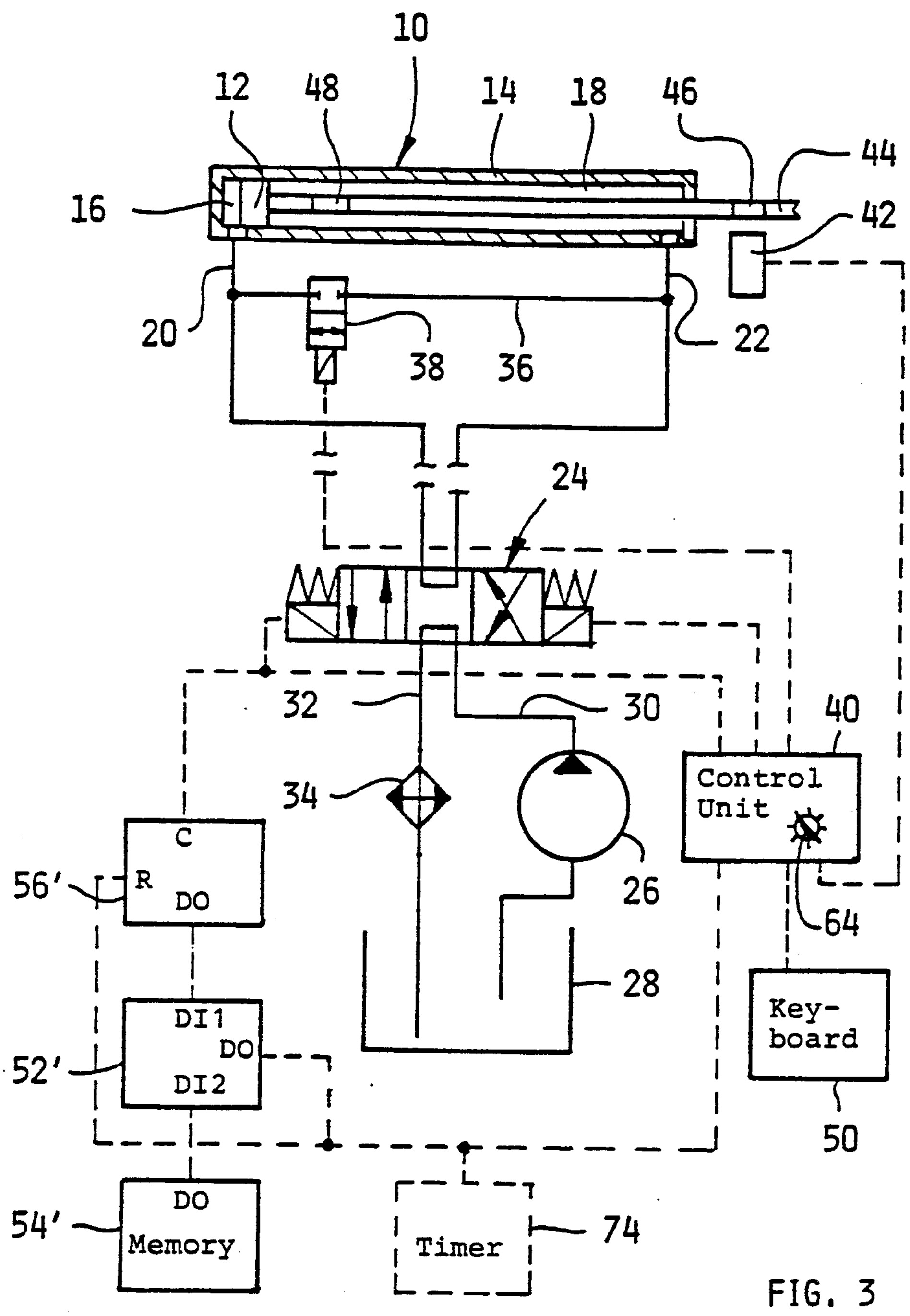

The invention is described in detail hereafter with reference to embodiments and referring to the drawings, in which:

FIG. 1 is a block circuit diagram of a hydraulic driving device, which comprises a working cylinder far from a hydraulic power source, with a cooling device for the hydraulic oil; and FIGS. 2 and 3 are each diagrammatic illustrations of a modified, hydraulic driving device with cooling of the hydraulic oil.

In FIG. 1, a double-acting hydraulic working cylinder is designated generally by the reference numeral 10. Arranged to slide therein is a piston 12, which together with a cylinder housing 14 defines two working chambers 16 and 18. The latter are connected by way of working lines 20, 22 to a reversing valve designated generally by the reference numeral 24. The working lines 20, 22 are of great length (in practice for example 70 meters up to 100 meters), as indicated by the sections of these lines represented by broken line.

The reversing valve 24 is a 4/3-way valve, which is biased by springs into the central inoperative position and is moved into one or other of its working positions by the excitation of operating magnets.

At the inlet side the reversing valve 24 is connected to the delivery opening of a hydraulic pump 26, which sucks liquid from a sump 28. The pressure line extending between the hydraulic pump 26 and the reversing valve 24 is designated by the reference numeral 30 in FIG. 1.

A return line 32 likewise connected to the reversing valve 24 contains a cooler 34 for the hydraulic oil.

Connected to the ends of the long working lines 20, 22 adjacent the working cylinder is a bypass line 36, which contains a normally closed bypass valve 38. The latter is a solenoid valve and like the reversing valve 24 is excited by a control unit 40.

As the input signals, the control unit 40 receives the output signal of a limit position sensor 42, which co-operates with limit position marks 46, 48 carried by the piston rod 44 of the working cylinder 10. The control unit 40 receives further input signals from a keyboard 50 connected thereto and from the output (DO) of a digital comparator 52.

From a fixed value memory 54, the comparator 52 receives a reference signal, which is connected continuously to the output signal of an analog-to-digital converter 56. Its input is connected by way of a 2-way switch 58 (shown diagrammatically), which is actuated in synchronism with the reversing valve 24, to the outputs of two temperature sensors 60, 62, which are inserted in the working lines 20, 22, in the immediate vicinity of the working cylinder 10. The synchronisation of the 2-way switch 58 is chosen so that whichever of the temperature sensors 60, 62 receives hydraulic oil flowing from the working cylinder 10, is connected to the digital-to-analog converter.

As a modification to the above-described embodiment, the 2-way switch 58 can also be switched over in a free-running manner at high frequency, in comparison with the switching frequency of the reversing valve 24, so that the digital-to-analog converter is supplied quickly in succession with analog temperature signals for the hydraulic oil flowing out or flowing in.

In the measured temperature of the hydraulic oil exceeds the maximum admissible temperature value determined by the fixed value memory 54, a signal is received at the output of the comparator 52, by which the control unit 40 is made to interrupt the periodic reversing of the working cylinder 10 and to control the bypass valve 38 in the open position. Simultaneously the reversing valve 24 is brought into one of its working positions. The hydraulic pump 26 now forces cool hydraulic oil, which is sucked at low resistance and therefore quickly, freshly from the sump 28, into the working lines 16 and 18. The hot hydraulic oil displaced in this case from the working lines 20, 22 passes by way of the cooler 34 back into the sump 28.

After carrying out such a scavenging process, the control unit 40 again closes the bypass valve 38 and the alternating excitation of the operating magnets of the reversing valve 24 is resumed.

The length of a scanvenging cycle described above in detail is determined by a timing member, which represents part of the control unit 40. The scavenging duration determined by this timing member can be adjusted for example at an adjusting knob 64 of the control unit 40 according to the respective length of the working lines 20, 22.

In the modified embodiment according to FIG. 2, parts of the driving device, which were described above with reference to FIG. 1, are given the same reference numerals; there is no need for these parts to be described again in detail hereafter.

In the driving device shown in FIG. 2, the reversing valve 24 is located on a frame part 68, which is closely adjacent to the frame part 66 supporting the working cylinder 10, but which is at least largely decoupled therefrom as regard vibration. The frame part 68 is also decoupled as regards vibrations from other parts of the working device comprising the working cylinder 10. The connection of the reversing valve 24 to the working cylinder 10 now takes place by way of short working lines 20', 22', which comprises flexible sections 70, 72.

The line connection (20', 22', 30', 32) between the working cylinder (10) and pump (26) or sump (34) being long as a whole and having a volume which is comparable with chamber (16, 18) of the working cylinder (10) or is larger than the latter.

The working lines 20' and 22' now have a volume, which is small compared with the volumes of the working chambers 16 and 18. The major part of the hydraulic oil located in the working chambers 16 and 18 is thus not exchanged in an oscillating manner by the working lines 20' and 22', on the contrary it passes in the device circuit from the pressure line 30 to the return line 32. Thus, the hydraulic oil is also continuously circulated through the cooler 34 and adequately cooled.

As a modification of the embodiments shown in FIG. 1, according to FIG. 3, in place of the temperature measurement in the working lines 20, 22 described with reference to FIG. 1, the working cycles of the working cylinder 10 may also be counted and the scavenging of the working lines 20, 22 initiated after a predetermined number of working cycles.

For this purpose, according to FIG. 3, one can also supply one of the output signals of the control unit 40 serving for the excitation of the reversing valve 24, to the counting terminal (C) of a counter 56', whereof the data output (DO) is connected to one data input (DI) 1 of a comparator 52', which again receives its reference signal from a fixed value memory 54'. Resetting of the counter 56' takes place, like the initiation of a scavenging cycle, due to the output signal of the comparator 52'.

The embodiment according to FIG. 3 otherwise operates in a manner similar to that according to FIG. 1.

For further simplification, one can simply connect the control terminal of the control unit 40, provided for the initiation of a scavenging operation, to the output of a very low frequency, free-running timing element 74, which then replaces the circuits 52'-54' of FIG. 3, as indicated in broken line in this Figure.

We claim:

1. A pressure medium-operated driving device which includes
   (a) a pump (26) having an outlet which supplies pressurized working fluid,
   (b) a double-acting working cylinder (10) having working chambers (16, 18),
   (c) a reversing valve (24),
   (d) a sump (28),
   (e) lines (20, 32, 22, 30) connecting the working chambers (16, 18) of the double-acting cylinder

(10) with the reversing valve (24) and the outlet of said sump (26), the volume of said lines at least equalling the volume of a working chamber (16, 18) of the double-acting working cylinder (10), (f) a cooling device (34) associated with at least one of said connecting lines (20, 32; 22, 30), (g) a valve controlled bypass line (36, 38) interconnecting end portions of said connecting lines (20, 32; 22, 30) adjacent to the double-acting working cylinder (10), and (h) a scavenging control (40) to open and close said valve controlled bypass line (36, 38).

2. A device according to claim 1 characterized in that the valve controlled bypass line (36, 38) connects end portions of the connecting lines (20, 32; 22, 30) which end portions extend between the reversing valve (24) and the working cylinder (10), and in that the scavenging control (40) brings the valve controlled bypass line valve (36, 38) into an open position and simultaneously brings the reversing valve (24) into one of its working positions.

3. A driving device according to claim 1 characterized in that the scavenging control (40) brings the valve controlled bypass line (36, 38) into an open position at predetermined time intervals and simultaneously controls the reversing valve (24) in one of its working positions.

4. A driving device according to claim 1 characterized in that the scavenging control (40) cooperates with a strokecounting device (52' to 56') and after a given number of working cycles of the working cylinder (10) brings the valve controlled bypass line (36, 38) into an open position and simultaneously controls the reversing valve (24) in one of its working positions.

5. A driving device according to claim 1 characterized in that the scavenging control (40) cooperates with at least one temperature sensor (60,62) inserted in one at the connecting lines (20, 32; 22, 30) in an end portion of the latter that is adjacent to the working cylinder (10) which brings the valve controlled bypass line (36, 38) into an open position and simultaneously controls the reversing valve (24) in one of its working positions when the temperature of the working fluid measured by the temperature sensor (60, 62) exceeds a given value.

6. A driving device according to claim 1 characterized in that the scavenging control (40) maintains an open position of the valve controlled bypass line (36, 38) and one working position of the reversing valve (24) for a given period of time.

7. A pressure medium-operated driving device which includes (a) a pump (26) having an outlet which supplies pressurized working fluid, (b) a double-acting working cylinder (10) having working chambers (16, 18), (c) a reversing valve (24), (d) a sump (28), (e) lines (20', 32; 22', 30) connecting the working chamber (16, 18) of the double-acting cylinder (10) with the reversing valve (24) and the outlet of said pump (26), the volume of said lines at least equalling the volume of a working chamber (16, 18) of the double-acting working cylinder (10), (f) a cooling device (34) associated with at least one of said connecting lines (20', 32; 22', 30), and (g) a scavenging control (40) to open and close the reversing valve (24), characterized in that the reversing valve (24) is located on a frame part (68) adjacent the working cylinder (10) and portions (20', 22') of the connecting lines (20', 32; 22', 30) connecting the reversing valve (24) to the working cylinder (100 having a small volume in comparison with the working chambers (16, 18) of the working cylinder (10).

8. A driving device according to claim 7 characterized in that the frame part (68) supporting the reversing valve (24) is decoupled as regards vibration from a frame part (66) supporting the working cylinder (10), and the working lines (20', 22') have flexible sections (70, 72).

* * * * *